United States Patent [19]
Hiramatsu et al.

[11] Patent Number: 6,135,459
[45] Date of Patent: Oct. 24, 2000

[54] METAL GASKET

[75] Inventors: Tsuyoshi Hiramatsu; Kenji Ishida; Kunitoshi Inoue, all of Osaka, Japan

[73] Assignee: Nippon Gasket Co., Ltd., Osaka, Japan

[21] Appl. No.: 09/166,567

[22] Filed: Oct. 6, 1998

[30] Foreign Application Priority Data

Oct. 15, 1997 [JP] Japan .................................. 9-296455

[51] Int. Cl.[7] .................................................. F02F 11/00
[52] U.S. Cl. ............................................................ 277/593
[58] Field of Search .................................. 277/593, 594, 277/595

[56] References Cited

U.S. PATENT DOCUMENTS

| | | | |
|---|---|---|---|
| 5,310,196 | 5/1994 | Kawaguchi et al. | 277/595 X |
| 5,348,315 | 9/1994 | Kawaguchi et al. | 277/595 |
| 5,588,657 | 12/1996 | Fujisawa et al. | 277/595 |
| 5,927,724 | 7/1999 | Maschmann et al. | 277/593 |
| 5,988,650 | 11/1999 | Plunkett | 277/593 |

FOREIGN PATENT DOCUMENTS 63-246573  10/1988  Japan .
626575   2/1994  Japan .

*Primary Examiner*—Anthony Knight
*Assistant Examiner*—Karlena D. Schwing
*Attorney, Agent, or Firm*—Browdy and Neimark

[57] ABSTRACT

In this metal gasket, the stopper plate stacked on the bead base plates has its reduced thickness portion whose thickness is smaller than the thickness of the stopper plate body-folded back to form a stopper portion. This structure provides the stopper portion with a limited stopper function with fewer parts. Between a pair of bead base plates that seal around the bore holes of the metal gasket is clamped an intermediate plate as the stopper plate. Around the bore holes in the intermediate plate are arranged folded portions, whose total thickness is larger than the thickness of the stopper plate body, to restrict the deformation of the beads. The folded portions are formed by folding back fold parts onto base parts that are thinner than the stopper plate body. This structure can limit the step height (stopper height) of the intermediate plate without using other parts such as metal plates or stopper pieces.

5 Claims, 3 Drawing Sheets

METAL GASKET

BACKGROUND OF THE INVENTION

1. Field of the Invention

The present invention relates to a metal gasket used to seal between opposing surfaces of structural members such as a cylinder block and a cylinder head in an engine and having a bead base plate formed with beads along cylinder bore holes.

2. Description of the Prior Art

Engines in recent years tend to use an aluminum material for structural members of the engine, such as cylinder head and cylinder block, as part of an effort to meet the demands for higher output and lighter weight. The engine structural members made of aluminum, such as cylinder head and cylinder block, though lighter in weight than those made of iron material, have smaller rigidity and thus tend to be displaced relative to each other in large amounts during engine operation. Hence, a metal gasket that seals between the opposing interfaces of these structural members is made of an elastic metal plate formed with beads along and near through-holes corresponding to the cylinder bore holes and water and oil passages.

A conventional metal gasket is known to be constructed of a pair of bead base plates made of an elastic metal plate and formed with beads. When the metal gasket is clamped between the opposing interfaces of the cylinder head and the cylinder block and tightened as by bolts to be fully compressed, the reactionary force produced as the beads of the paired bead base plates are pressed and flattened causes the bead base plates and a stopper plate to be strongly pressed against each other between the opposing interfaces at the beads and in their vicinity, with the beads forming an annular, elastic contact portion, thus producing a sealing action to prevent fluids running through the cylinder bore holes from leaking from the opposing interfaces.

Further, in the case of a cylinder head gasket, during the engine combustion cycle the clearance between the cylinder head and the cylinder block repetitively increases and decreases applying cyclic stresses, i.e., mechanical stresses and thermal stresses, to the metal gasket. The load variation-induced stresses cause large deformations in those portions of the cylinder block and the cylinder head having least rigidity, resulting in the beads permanent set in fatigue or cracking, degrading the sealing performance.

The beads of the metal gasket, when subjected to varying stresses and deformations caused by vibrations between the cylinder block and the cylinder head during engine operation, are apt to result in a fatigue failure. To prevent the fatigue failure, the elastic metal plate has a stopper plate stacked therein which has a stopper function to minimize the deformation of the beads. The stopper plate typically has folded portions to increase its thickness in areas between beads of the bead base plate and the cylinder bore holes. The deformation of the beads is reduced to the extent that the stopper plate thickness has increased. In addition to the stopper function of restricting the deformation of the bead base plate, the stopper plate also has a compensation function to offset a irregularity of clearance between the opposing interfaces.

In the metal gasket described above, simply forming the folded portions in the stopper plate to provide the stopper function results only in the thickness of the folded portions being doubled. Having twice the stopper plate thickness at the folded portions may be more than enough to effect the stopper function and may cause extreme surface pressure concentrations around the cylinder bore holes. The surface pressure concentrations at the folded portions in turn cause an imbalance between the surface pressure around the bore holes and the surface pressure at peripheries (of water and oil holes) other than the bore hole peripheries, degrading the sealing performance around the water and oil holes. Such surface pressure concentrations will also produce stress concentrations and therefore cracks in the folded portions, particularly in bent edge portions defining the bore holes. Further, because the beads of the bead base plate are not given sufficient elastic deformations due to the increased thickness of the folded portions, there will arise a problem of failure to form secure annular contact portions.

Hence, metal gaskets are known (found, for example, in Japanese Patent Laid-Open Nos. 246573/1988 and 26575/1994), in which the deformation of the beads increases to effectively utilize the stopper function of the stopper plate and to prevent excess concentration of the surface pressures around the bore holes when the metal gasket is clamped and tightened between a pair of structural members.

The Japanese Patent Laid-Open No. 246573/1988 discloses a laminated metal gasket having a stopper plate inserted between two bead base plates formed of elastic metal plate, in which a first stopper plate and a second stopper plate thinner that the first stopper plate are stacked together and placed between the two bead base plates and in which the edges of the first stopper plate on the bore hole side are folded over, but spaced from, the second stopper plate to form a compensation portion of a predetermined thickness overlapping the bead base plate. This laminated metal gasket prevents expansion or contraction of a deck surface clearance between the cylinder block and the cylinder head due to combustion gas pressures and the thermal influences of the engine, thus weakening the action of the alternating load on the beads to prevent a permanent set in fatigue.

The Japanese Patent Laid-Open No. 26575/1994 discloses a metal gasket, in which at least one elastic metal plate is formed with beads, and a stopper, which is a separately formed metal plate, is located at a flat portion on the cylinder bore side with respect to the beads and has a thickness corresponding to a clearance dimension around the cylinder bore when tightened. Because the stopper is a separately formed metal plate, the metal gasket has high machining precision of the stopper and can fully adjust the thickness of the stopper, allowing for a uniform surface pressure around the cylinder bore and securing the roundness of the bores to improve the sealing performance.

In the metal gaskets comprising bead base plates made of an elastic metal plate formed with beads around the cylinder bore holes and a stopper plate having a stopper function of minimizing deformation of the beads, there is a possibility that if the level of stopper function performed by the stopper plate can be changed without increasing the number of layers of the stopper plate and the number of parts, a low-cost metal gasket with a simplified construction can be provided while maintaining the sealing performance and the surface pressure balance found in the prior art metal gaskets.

SUMMARY OF THE INVENTION

An object of this invention is to provide a metal gasket, which comprises bead base plates made of elastic metal plates formed with beads and a stopper plate stacked on the bead base plates and having folded portions that are formed by folding back a part of the stopper plate to restrict the deformation of the beads, and in which the stopper function to restrict the total compression of the beads is made adjustable at low cost by easily changing the thickness of the folded portions.

This invention relates to a metal gasket, which comprises: at least one bead base plate made of an elastic metal plate formed with beads along first bore holes; and a stopper plate made of a metal plate formed with second bore holes corresponding to the first bore holes and stacked on the at least one bead base plate so that it contacts raised portions of the beads; wherein the stopper plate comprises a stopper plate body and folded portions formed integral with the stopper plate body and folded in annular shape along the first bore holes to form the second bore holes; wherein the folded portions comprise base parts formed integral with the stopper plate body and extending around the second bore holes and fold parts folded and placed over the base parts; wherein the raised portions of the beads of at least one of the bead base plate are stacked on the stopper plate at positions spaced from the folded portions of the stopper plate; wherein the total thickness of the folded portion of the stopper plate is set larger than the thickness of the stopper plate body but smaller than twice the thickness of the stopper plate body.

Because the total thickness of the folded portions of the stopper plate is larger than the thickness of the stopper plate body but smaller than twice the thickness of the stopper plate body, the stopper function of the stopper plate can be reduced to below the stopper function of the stopper portion that is made by folding a stopper plate with a uniform thickness. When this metal gasket is clamped and tightened between the opposing interfaces of, for example, the cylinder head and the cylinder block of the engine, excess surface pressures are prevented from concentrating on the folded portion of the stopper plate. Further, because the beads of the bead base plates are appropriately compressed and deformed, the beads can form elastic, annular contact portions enough to offer a satisfactory sealing performance.

Further, the folded portions are made by folding back a part of the reduced thickness portion whose thickness is smaller than the thickness of the stopper plate body but larger than half the thickness of the stopper plate body. Because the reduced thickness portion has a thickness smaller than the thickness of the stopper plate body but larger than half the thickness of the stopper plate body, when a part of the reduced thickness portion is folded back onto the remaining part of the reduced thickness portion, i.e., the base part, the total thickness of the folded portion is thicker than the stopper plate body but thinner than twice the thickness of the stopper plate body.

Further, the stopper height for the beads provided by the difference between the total thickness of the folded portion and the thickness of the stopper plate body is adjusted by the thickness of the reduced thickness portion which is smaller than the thickness of the stopper plate body. The reduced thickness portions are worked by pressing, cutting or etching to reduce their thickness along holes smaller in diameter than the second bore holes formed in the stopper plate. For example, the reduced thickness portion are worked by pressing, cutting or etching a metal plate. The portions with a progressively decreasing thickness are preferably formed by pressing or cutting a metal plate.

The reduced thickness portions of the stopper plate are either formed to a predetermined constant thickness or tapered so that their thickness decreases away from the stopper plate body. Further, nearly intermediate parts of the portions of the stopper plate having a gradually decreasing thickness constitute folded edge parts that define the bore holes of the stopper plate corresponding to the bore hole s in the bead base plates. Folding back the tapered, reduced thickness portion with a progressively decreasing thickness makes the total thickness of the folded portion almost uniform because the thicknesses of the base part and the fold part cancel out each other. This of course is true also with the reduced thickness portion with a constant thickness.

The stopper plate body of the stopper plate is clamped between a pair of raised portions of the beads of the bead base plates. In this case, the stopper plate is an intermediate plate clamped between the paired bead base plates and has a stopper function that commonly restricts the deformations of the beads for both bead base plates.

The metal gasket, as described above, has a stopper plate which comprises a body portion and a folded portion that is formed by simply folding back a metal plate with a uniform thickness. The stopper plate may provide an excessive stopper function, but because the total thickness of the folded portion of the stopper plate is larger than the thickness of the stopper plate body but smaller than twice the thickness of the stopper plate body, a metal gasket can be obtained which has a restrained stopper function of the stopper plate without increasing the number of intermediate plates or providing stopper pieces as separate parts.

Because, when the metal gasket is clamped and tightened between opposing interfaces of, say, the cylinder head and the cylinder block of an engine, no excessive surface pressure concentrates on the folded portion, the folded portions, particularly the folded edge parts that define the bore holes, are free from cracks. The areas around the bore holes are subject to influences of hot corrosive burning gases and thus the bead base plates are formed of high-quality metal materials with high heat and corrosion resistances. Because the folded portions are thicker than the stopper plate body, they can fully prevent hot corrosive combustion gases from entering into the areas of beads of the elastic metal plates. Furthermore, because the total thickness of the folded portions is smaller than two times the thickness of the stopper plate body, the folded portions can cause proper compression and deformation of the beads of the bead base plates which in turn can form elastic, annular contact portions suited for sealing.

DETAILED DESCRIPTION OF THE EMBODIMENT

Now by referring to the accompanying drawings, embodiments of the metal gasket of this invention will be described.

First, let us turn to FIGS. 1 to 5 and one embodiment of the metal gasket of this invention will be explained.

Figure 1:
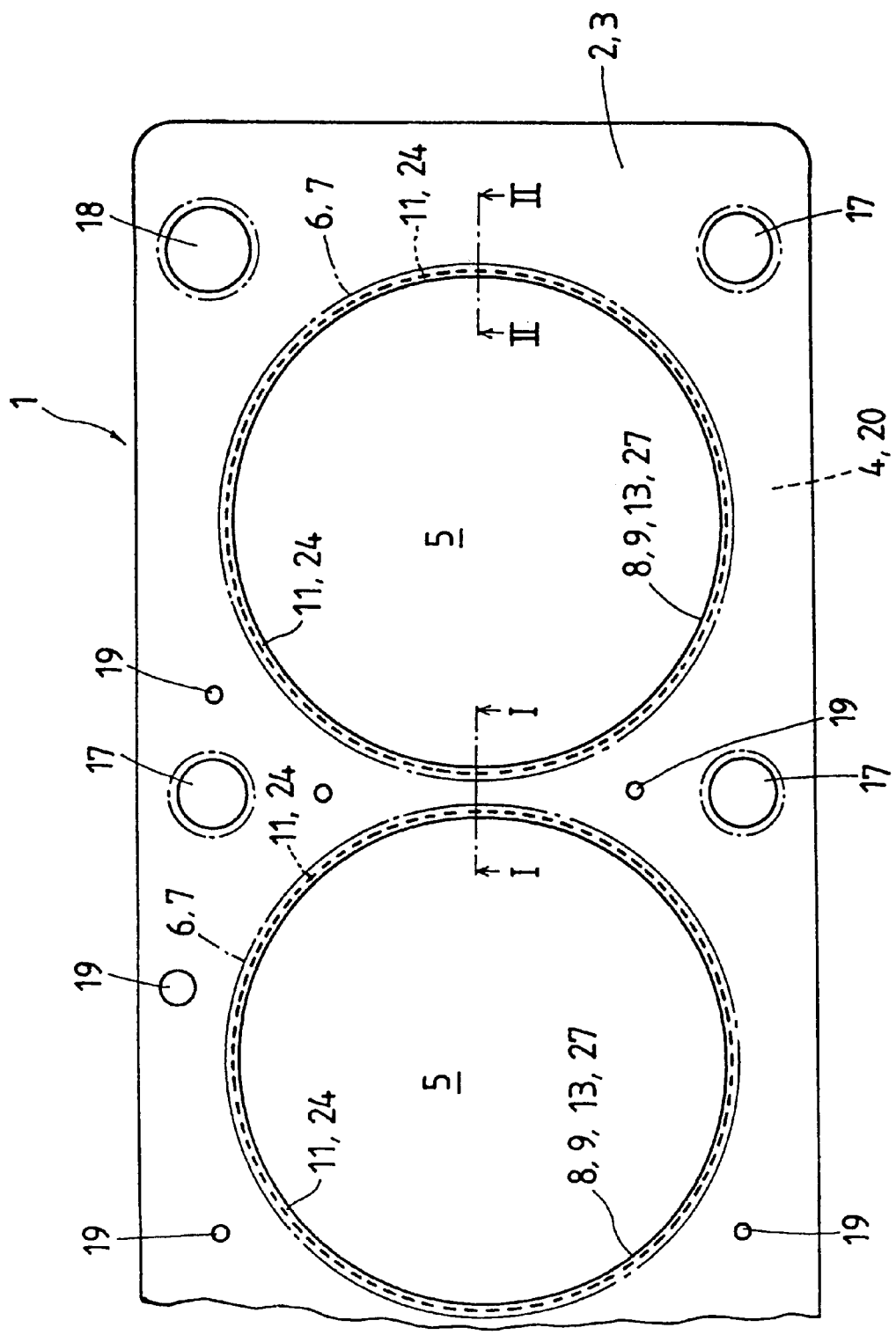
FIG. 1 is a plan view showing a part of one embodiment of the metal gasket of this invention.
Figure 2:
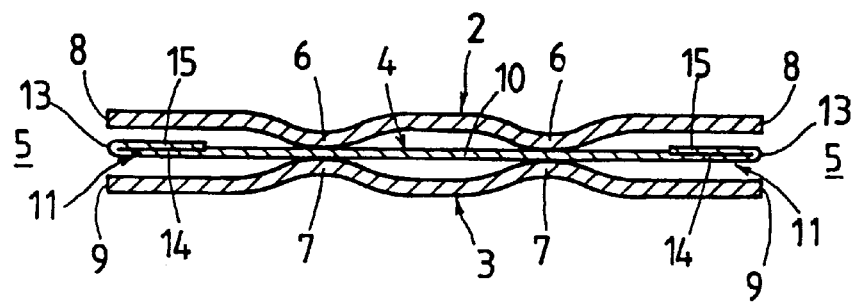
FIG. 2 is a cross section of the metal gasket taken along the line I—I of FIG. 1.
Figure 3:
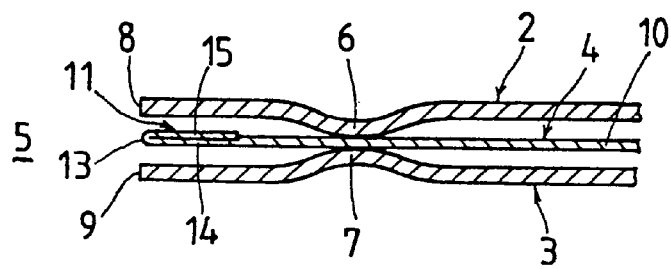
FIG. 3 is a cross section of the metal gasket taken along the line II—II of FIG. 1.

As shown in FIG. 1, a metal gasket 1 is installed between opposing interfaces of a cylinder head and a cylinder block in a multicylinder engine to seal between these opposing interfaces. The metal gasket 1, as shown in FIGS. 2 and 3, comprises two bead base plates 2, 3 made of elastic metal plates stacked together and a stopper plate 4 as an intermediate plate clamped between the bead base plates 2, 3.

The elastic metal plates, i.e., the bead base plates 2, 3, are made by punching a metal material such as spring stainless steel plate, forming it with beads and subjecting it to heat treatment and surface treatment to provide it with a specified tensile strength, elongation and hardness. The stopper plate 4 is made by punching a metal material such as spring stainless steel plate and working it to form folded portions.

The bead base plates 2, 3 are formed with parallelly arranged bore holes 5 corresponding to the number and locations of the cylinder bores formed in the cylinder block. The bead base plate 2 is formed with bore holes 5 along bore hole edges 8, and the bead base plate 3 is formed with the bore holes 5 along bore hole edges 9. The bead base plates 2, 3 have bore holes 5 at the same positions and in the same size.

The bead base plate 2 is formed with annular beads 6 along the bore holes 5. The bead base plate 3 is formed with annular beads 7 along the bore holes 5. The stopper plate 4 is formed with annular folded portions 11 along the bore holes 5.

The bead base plates 2, 3 are arranged so that raised portions of the beads 6, 7 formed along the edges 8, 9 of the bore holes 5 oppose each other. The height and width of the beads 6, 7 may be varied according to the circumferential position even around the same bore hole 5. For example, in small engines, because the area between the adjacent bore holes 5 is very small, the widths of the beads 6, 7 in the adjoining area is set smaller than those of the beads 6, 7 in other areas. The width of the bead can be increased progressively as it goes away from the area between the adjoining bore holes 5. The beads of the bead base plates 2, 3 may be given some changes in shape, as by setting the portion of the beads in the area between the adjoining bore holes 5 higher than in other areas to produce a higher sealing force in the adjoining area. The areas between other adjoining bore holes 5 also have the same cross-sectional structure of the bead base plates 2, 3 and the stopper plate 4 in a stacked state as shown in FIGS. 2 and 3.

With the metal gasket 1 clamped between the opposing interfaces of the cylinder head and the cylinder block and tightened as by bolts, the beads 6, 7 are pressed against each other and deformed. The reactionary force produced by the beads 6, 7 as they are elastically pressed and deformed forms an elastic annular contact portion between the opposing interfaces around the bore holes 5 where a high sealing performance is required, the elastic annular contact portion producing a sufficiently high surface pressure around the bore holes 5 to provide a desired sealing function to prevent a fluid such as burning gas passing through the bore holes 5 from leaking between the opposing interfaces. Each of the beads 6, 7 of the bead base plates 2, 3 at their inner and outer skirt positions presses against the opposing interfaces to form seal lines, thus securing the desired sealing performance between the adjoining bores where a hot combustion gas is likely to leak. Around the bore holes 5 in other than the areas between the adjoining bore holes, the leakage likelihood of the combustion gas is smaller than in the areas between the adjoining bores, so that the beads 6, 7 are formed as a single strip of bead.

The bead base plates 2, 3 and the stopper plate 4 are further formed with bolt holes 17, knock holes 18, water holes 19, blow-by holes and oil holes. These are known technologies in the field of metal gasket and their detailed descriptions are omitted here. Around these holes are formed half beads for sealing.

At least the outside surfaces or the opposing inner side surfaces of the bead base plates 2, 3 are coated with a nonmetallic material, such as rubber (fluororubber, for example) and resin, to a thickness of 10 $\mu$ to 20 $\mu$. This avoids a metal-to-metal contact of the gasket with the cylinder head and the cylinder block, securing the anticorrosion resistance, durability and strength of the metal gasket. Further, if the machined surfaces of the bead base plates 2, 3, the stopper plate 4 and of the opposing interfaces of the cylinder head and the cylinder block have undulations, the undulated surfaces can be smoothed out by the nonmetallic material to perform a satisfactory sealing function.

Figure 4:
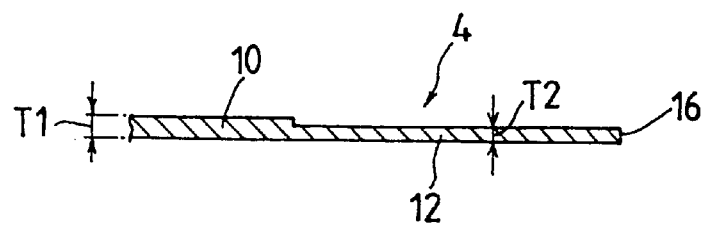
FIG. 4 is a partial cross section showing one example of the stopper plate used in the metal gasket of this invention before the folded portion is formed.

Next, by referring to FIGS. 4 and 5 the process of forming the folded portions 11 in the stopper plate 4 will be described. FIG. 4 is a partial cross section of the stopper plate 4 before the stopper plate 4 is formed with the folded portions 11, and FIG. 5 is a partial cross section of the stopper plate 4 of FIG. 4 after the stopper plate 4 is formed with the folded portions 11.

For the folded portions 11 to be formed along the bore holes 5, the stopper plate 4 is formed, as by punching, with holes defined by hole edges 16 which correspond in numbers to, and are smaller in diameter than, the bore holes 5. The stopper plate 4, as shown in FIG. 4, comprises a stopper plate body 10 forming the body portion of the stopper plate 4 and having a thickness T1 and a reduced thickness portion 12 formed integral with the stopper plate body 10 and having a reduced thickness T2 along the hole edge 16, the reduced thickness portion 12 being adapted to be formed into the folded portion 11. The reduced thickness portion 12 can be formed, as by pressing, cutting or etching, into an annular shape having a specified width along the small-diameter hole edge 16. The reduced thickness portion 12 is worked to have the thickness T2, which is thinner than the thickness T1 of the stopper plate body 10 but thicker than half the thickness T1. In other words, the thickness T1 of the stopper plate body 10 is larger than the thickness T2 of the reduced thickness portion 12 but smaller than two times the thickness T2 ($2 \times T2 > T1 > T2$). Hence, the total thickness T3 of the folded portion 11 in the metal gasket 1 is twice the thickness T2 ($2 \times T2 = T3$).

Figure 5:
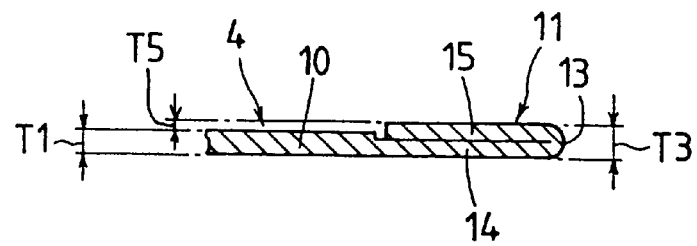
FIG. 5 is a partial cross section showing the stopper plate of FIG. 4 after the folded portion is formed.

As shown in FIG. 5, the folded portion 11 is made by folding a part of the reduced thickness portion 12 on the hole edge 16 side as a fold part 15 so that the fold part 15 is placed over a base part 14, the remaining part of the reduced thickness portion 12. A folded edge part 13 of the folded portion 11 defines a bore hole 5 that corresponds to the bore holes 5 formed in the bead base plates 2, 3. In FIGS. 2 and 3, the base part 14 and the fold part 15 are shown as constitutional parts of the folded portion 11 formed along the bore hole 5.

The total thickness T3 of the folded portion 11, as described above, is the sum ($=2 \times T2$) of the thickness of the base part 14 and the thickness of the fold part 15, and is larger than the thickness T1 of the stopper plate body 10 but smaller than twice the thickness T1. Hence, a stopper height T5 given by the folded portion 11 of the stopper plate 4 is T3−T1 ($=2 \times T2 - T1$), which is a step height T5. This stopper height T5 is formed smaller than the step height T1 of the folded portion formed when folding the stopper plate having the same thickness as T1. That is, the stopper height T5 formed at the folded portion 11 by folding the reduced thickness portion offers a stopper function with a smaller step height than the thickness of the body portion of the stopper plate 4.

The folded portion 11 contacts the bead base plates 2, 3 to form a kind of seal line, thus preventing a corrosive hot burning gas from entering into the regions of the beads 6, 7 of the bead base plates 2, 3.

While in this embodiment the stopper height T5 is about 50–100 µm, the radial width and the stopper height of the folded portion 11 may be changed according to the circumferential position even along the same bore hole 5. For example, the stopper height T5 is set large in an area between the adjoining bore holes 5 and small in an area most remote from between the adjoining bore holes 5. The stopper height in an intermediate area between these two areas may be smoothly changed from one stopper height to another. The stopper height T5 in an area close to the bolt hole 17 may be formed smaller than the stopper height in an area remote from the bolt hole 17 to alleviate the influences of large tightening force of the bolt.

Figure 6:
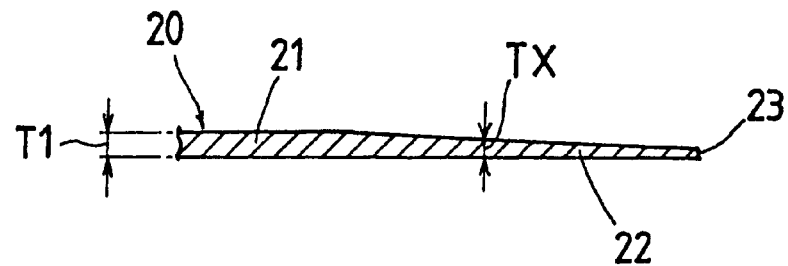
FIG. 6 is a partial cross section showing another example of the stopper plate used in the metal gasket of this invention before the folded portion is formed.
Figure 7:
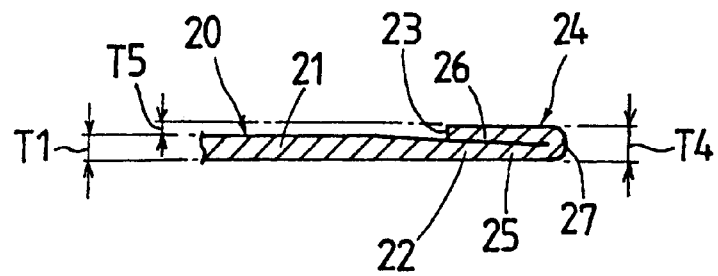
FIG. 7 is a partial cross section showing the stopper plate of FIG. 6 after the folded portion is formed.

Next, by referring to FIGS. 6 and 7, another embodiment of the stopper plate used in the metal gasket 1 will be described. FIG. 6 shows a metal plate before a stopper plate 20 is formed with a folded portion 24. FIG. 7 shows a metal plate after the stopper plate 20 has been formed with the folded portion 24.

The stopper plate 20, in place of the stopper plate 4 shown in FIGS. 2 and 3, is installed between the bead base plates 2, 3 formed with the beads 6, 7 to be incorporated into the metal gasket 1. As shown in FIG. 6, the stopper plate 20 comprises a stopper plate body 21 forming the body portion of the stopper plate 20 and having a thickness T1 and a reduced thickness portion 22 with its thickness TX tapered to progressively decrease from the stopper plate body 21 to a hole edge 23. A folded portion 24 is made by folding nearly a half of the reduced thickness portion 22 on the hole edge 23 side so that a fold part 26 is placed over a base part 25. A folded edge part 27 of the folded portion 24 defines the bore hole 5.

In the stopper plate 20, the thickness T4, which is the sum of the thickness TX of the base part 25 and the thickness of the fold part 26, is larger than the thickness T1 of the stopper plate body 21 but smaller than two times the thickness T1 ($2 \times T1 > T4 > T1$). The total thickness T4 of the folded portion 24 in the metal gasket 1 is twice the thickness TX ($2 \times TX = T4$). In other words, the thickness T1 of the stopper plate body 21 is larger than the thickness TX of the reduced thickness portion 22 but smaller than twice the thickness TX of the reduced thickness portion 12 ($2 \times TX > T1 > TX$). Hence, the stopper height T5 provided by the folded portion 24 of the stopper plate 20 is given by T4−T1 ($=2 \times TX-T1$), which is a step height T5.

Figure 8:
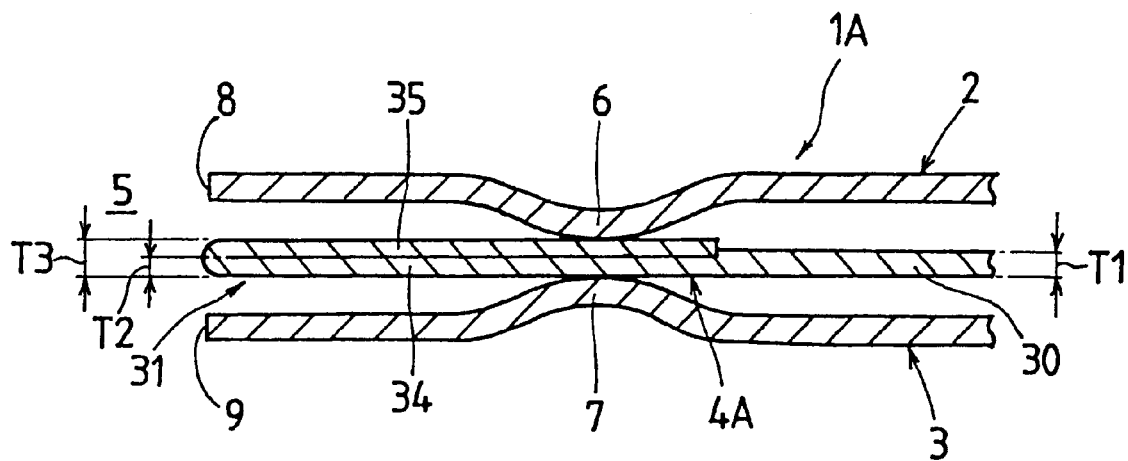
FIG. 8 is a partial cross section of another embodiment of the metal gasket of this invention.

Next, by referring to FIG. 8, a further embodiment of the metal gasket of this invention will be described. A metal gasket 1A shown in FIG. 8 is similar in construction to the metal gasket 1 of FIG. 3 with the same bead base plate used, except that an intermediate plate 4A (FIG. 8) is employed instead of the stopper plate 4 (FIG. 3). In the metal gasket 1A, constitutional elements having identical functions with those of the elements of the metal gasket 1 are assigned the same reference numbers as used in FIG. 3, and repetitive explanations are omitted.

In this embodiment, the intermediate plate 4A comprises an intermediate plate body 30 and a folded portion 31. The folded portion 31 comprises a base part 34 and a fold part 35 placed over the base part 34 and has a thickness relation similar to the one shown in FIGS. 4 and 5 ($2 \times T2 = T3 > T1 > T2$). The folded portion 31 extends from the intermediate plate body 30 to the beads 6, 7 of the bead base plates 2, 3 and is formed integral with the intermediate plate body 30. Thus, if the beads 6, 7 of the bead base plates 2, 3 are formed relatively low, the intermediate plate 4A having the folded portion 31 inserted between the beads 6, 7 assures a sufficient surface pressure when the gasket is tightened. By setting the thickness of the folded portion 31 appropriately, not only can the surface pressure around the bore holes 5 and the surface pressure at areas other than the bore hole 5 peripheries when the metal gasket 1A is tightened between the opposing interfaces be balanced easily but irregularity of the opposing interfaces (deck surfaces) where the metal gasket 1A is arranged can be effectively compensated for as well.

One embodiment of this invention has been described above. It is noted that the metal gasket of this invention is not limited to the application where it is installed between the opposing interfaces of the cylinder head and the cylinder block as engine components, but can also be applied to, for example, manifolds. Rather than being set to the same thickness and shape, the thickness of the bead base plates and the shape of the beads such as height and width can be modified as required according to the physical properties, such as material and hardness, of the opposing interfaces of the engine components and to the specifications of the engine, when determining the specifications of the metal gasket. Although the beads between the adjacent bore holes have been described as separate beads, they can be merged into a single bead as long as the merged bead can secure the required sealing performance.

What is claimed is:

1. A metal gasket comprising:

at least one bead base plate made of an elastic metal plate formed with beads along first bore holes; and a stopper plate made of a metal plate formed with second bore holes corresponding to the first bore holes and stacked on the at least one bead base plate so that said stopper plate contacts raised portions of the beads;

wherein the stopper plate comprises a stopper plate body and folded portions formed integral with the stopper plate body and folded in annular shape along the first bore holes to form the second bore holes;

wherein the folded portions comprise base parts formed integral with the stopper plate body and extending around the second bore holes and fold parts folded and placed over the base parts;

wherein the raised portions of the beads of the at least one bead base plate are stacked on the stopper plate at positions spaced from the folded portions of the stopper plate;

wherein the total thickness of the folded portion of the stopper plate is set larger than the thickness of the stopper plate body but smaller than twice the thickness of the stopper plate body;

wherein the folded portions are formed by folding back a part of reduced thickness portions, the reduced thickness portions having a thickness smaller than the thickness of the stopper plate body but larger than half the thickness of the stopper body, and wherein the reduced thickness portions of the stopper plate are tapered so that their thickness decreases away from the stopper plate body.

2. A metal gasket according to claim 1 wherein a stopper height for the beads provided by the difference between the total thickness of the folded portion and the thickness of the stopper plate body is adjusted by the reduced thickness portions which are smaller than the thickness of the stopper plate body.

3. A metal gasket according to claim 1 wherein the reduced thickness portions of the stopper plate are worked by pressing, cutting or etching to reduce their thickness along holes smaller in diameter than the second bore holes formed in the stopper plate.

4. A metal gasket according to claim 1 wherein the stopper plate body of the stopper plate is clamped between a pair of the raised portions of the beads respectively located on a pair of bead base plates.

5. A metal gasket comprising:

- a pair of bead base plates made of elastic metal plates formed with beads along first bore holes; and
- an intermediate plate made of a metal plate formed with second bore holes corresponding to the first bore holes stacked on the bead base plates so that it contacts raised portions of the beads;

wherein the intermediate plate comprises an intermediate plate body and folded portions formed integral with the intermediate plate body and folded in annular shape to form the second bore holes along the first second bore holes;

wherein the folded portions comprise base parts formed integral with the intermediate plate body and extending around the bore holes and fold parts folded and placed over the base parts;

wherein the folded portions of the intermediate plate body extend from the intermediate plate body to the beads of the bead base plates and are clamped between a pair of the raised portions of the beads of the bead base plates, whereby the folded portion inserted between the beads assure a sufficient surface pressure when the gasket is tightened even if the beads of the bead base plates are formed relatively low;

wherein the folded portions are formed by folding back a part of reduced thickness portions, the reduced thickness portions having a thickness smaller than the thickness of the stopper plate body but larger than half the thickness of the stopper body, and wherein the reduced thickness portions of the stopper plate are tapered so that their thickness decreases away from the stopper plate body.

\* \* \* \* \*